June 6, 1939. P. SCHULTZE 2,161,434
HAT-BRIM FLANGING MACHINE
Filed Dec. 23, 1936 8 Sheets-Sheet 1

Fig.1

INVENTOR
Paul Schultze
BY
C. M. Newman
ATTORNEY

June 6, 1939. P. SCHULTZE 2,161,434
HAT-BRIM FLANGING MACHINE
Filed Dec. 23, 1936 8 Sheets-Sheet 3

Fig. 3

INVENTOR
Paul Schultze
BY
C. M. Newman
ATTORNEY

June 6, 1939.　　　P. SCHULTZE　　　2,161,434
HAT-BRIM FLANGING MACHINE
Filed Dec. 23, 1936　　8 Sheets-Sheet 4

INVENTOR
Paul Schultze
BY
C. M. Newman
ATTORNEY

June 6, 1939.　　　　P. SCHULTZE　　　　2,161,434
HAT-BRIM FLANGING MACHINE
Filed Dec. 23, 1936　　　8 Sheets-Sheet 6

INVENTOR
Paul Schultze
BY
C. M. Newman
ATTORNEY

Patented June 6, 1939

2,161,434

UNITED STATES PATENT OFFICE 2,161,434

HAT-BRIM FLANGING MACHINE

Paul Schultze, Danbury, Conn., assignor to Doran Bros., Inc., Danbury, Conn., a corporation of Connecticut Application December 23, 1936, Serial No. 117,310

22 Claims. (Cl. 223—21)

My present invention has reference to hat brim flanging machines of the type employing a heated iron for operating upon the underside of the brim in a way to form a rolled edge, as distinguished from the sand bag type of flanging machine. The sand bag type of flanging machine is satisfactorily used on some grades of hats, while the type of machine forming the subject matter of this application and employing a heated iron, is more generally used on the better quality of hats.

It is the purpose of my present invention to generally improve hat brim flanging machines of this class which will produce an improved quality of work.

An object of the invention is to produce a machine which will be entirely automatic in its operation, from start to finish, the operator being only required to raise the arm to place the heated iron upon the hat brim, which action automatically starts the machine in operation and with the continued rotation of the hat carrying lathe and the movement of the iron across the underface of the brim results in the complete flanging of the same and operation of a trip mechanism whereby the iron and its arm are released and thrown off from the hat and the machine stopped.

Another object of the invention is to provide an improved form of oval lathe whereby the hat body is fed to the iron at a uniform rate of speed without causing any interruptions or undue uneven pressure on the quarters of the hat thereby insuring a uniform ironing operation.

A further object of the invention is to provide an improved iron carrying arm having mechanism which insures a relatively light though firm and uniform engagement of the iron with the under surface of the hat brim, including the outer curled edge portion. I also provide spring means for providing required tension of the iron upon the brim during its movement across the brim, and to provide means for utilizing the same spring, at the completion of an operation to throw the arm out of engagement with the hat.

Other features of advantage will be apparent as the description of the construction of the machine progresses and also as will be summed up in the claims.

Throughout the several figures of the drawings which form a part of this specification similar characters of reference will be found to designate like or corresponding parts and in which.

Referring in detail to the characters of reference marked upon the drawings 15 represents a pedestal which forms the sole support of the machine and upon which all of the operating mechanisms are mounted. A relatively large closure plate 16 is removably secured to the back of this pedestal and serves to inclose the internal parts including the driving motor 17 mounted in a hanger 18 in the base of the machine and the oval lathe mechanism. These parts together with a bracket 19 secured to one side of the pedestal, see Figs. 1, 2 and 3, comprise the fixed parts of the machine.

The machine includes two principal sets of mechanisms, one of which is driven through the other, from the motor, each set serving to perform separate functions though geared to operate in unison with each other. The lathe 20 of these mechanisms is contained within the pedestal and serves to rotate the hat block 21 upon which the hat A is mounted, in an oval path, while the iron 22 which traverses the underside of the hat brim B is manipulated through the second set of mechanisms that is supported upon the before mentioned arm 19 and driven from the motor through a portion of the lathe mechnism.

Figure 9:
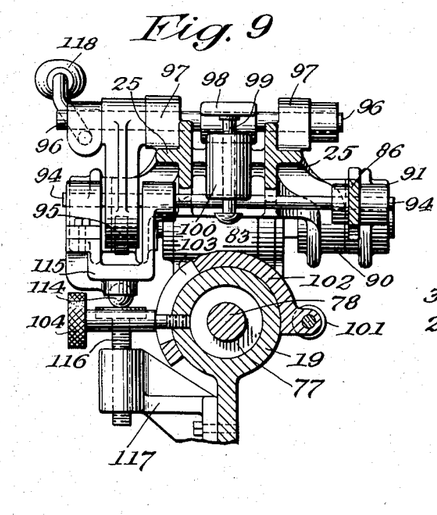
Fig. 9 shows a cross sectional view through the iron carrying arm and its supporting means, taken on line 9—9 of Fig. 5.
Figure 10:
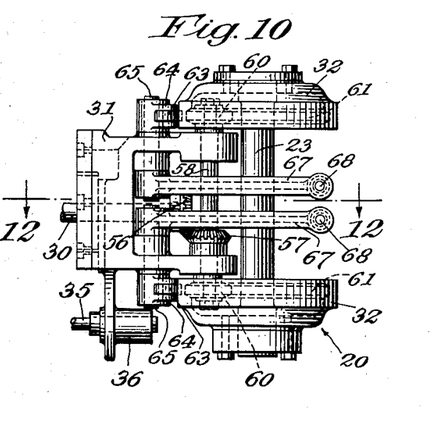
Fig. 10 is a detached side elevation of the lathe operating mechanism contained within the pedestal of the machine, as would be seen from the left of Fig. 1.
Figure 11:
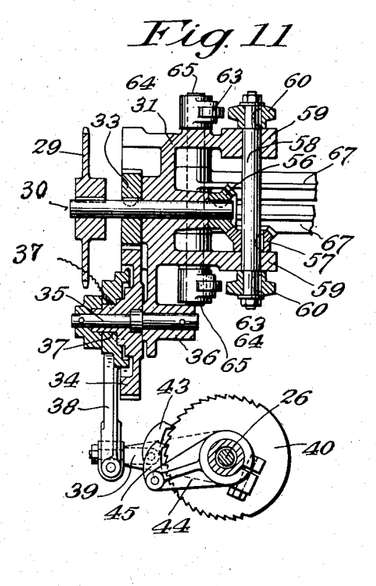
Fig. 11 is a central vertical sectional view through the same oval lathe rotating mechanism, together with the connected eccentric for operating the ratchet and cam, and as shown in Figs. 1 and 2.
Figure 12:
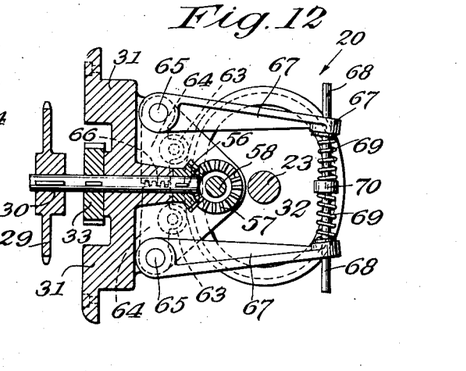
Fig. 12 shows a sectional plan view of this same lathe operating mechanism taken on line 12—12 of Fig. 10.

The lathe of the machine, see Figs. 10, 11 and 12, designated generally as 20 is of an improved type serving to rotate its spindle 23 in an oval manner, better to accommodate the oval surface of the underside of the brim B of the hat A to the heated iron 22 which operates upon the brim. The rotation of the lathe and its hat block 21 and the movement of the arm 25 carrying the iron 22 are operatively connected though are operated through separate mechanisms as will be shown. The lathe operating mechanism is contained within the hollow pedestal of the machine as is disclosed in Figs. 1 and 2 and is further illustrated in Figs. 9, 10 and 11 whereas the arm 25 and its associated operating mechanism which carry the heated iron are mounted upon the bracket 19 projecting outward from the side of the upper portion of the pedestal.

Figure 4:
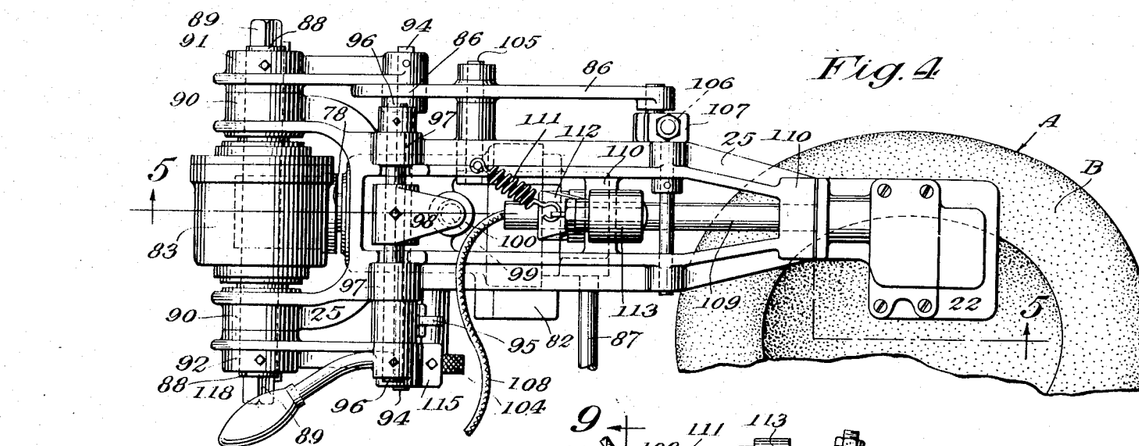
Fig. 4 illustrates a top plan view of the machine, on an enlarged scale, the iron and its supporting arm being in the same position as that shown in the preceding figures, a hat that is broken away, being mounted in a rotatable hat block, in an inverted position.

Since it is the undersurface of the brim B of the hat A which is to be operated on, I necessarily mount the hat in an inverted position in the hat block so that the top surface of the brim lays upon the undersurface of the block thereby exposing only the undersurface of the brim, to be operated upon. I therefore provide an iron supporting and guiding means, whereby the iron for the beginning of an operation, see Fig. 4, is positioned upon the underside of the hat brim adjacent the band portion, and whereby the iron is gradually fed outward, crosswise of the brim, during the rotation of the lathe block and hat. During this outward travel of the arm and iron they are counterbalanced so as to move around and hug the curled edge of the brim until the operation is completed whereupon the arm is released and quickly thrown off, see Fig. 6, from the brim leaving the hat free to be removed.

With the foregoing brief disclosure of the two sets of mechanisms, one for the lathe carrying the hat and the other for the iron, I will now proceed with the detail description of the lathe mechanism.

Figure 1:
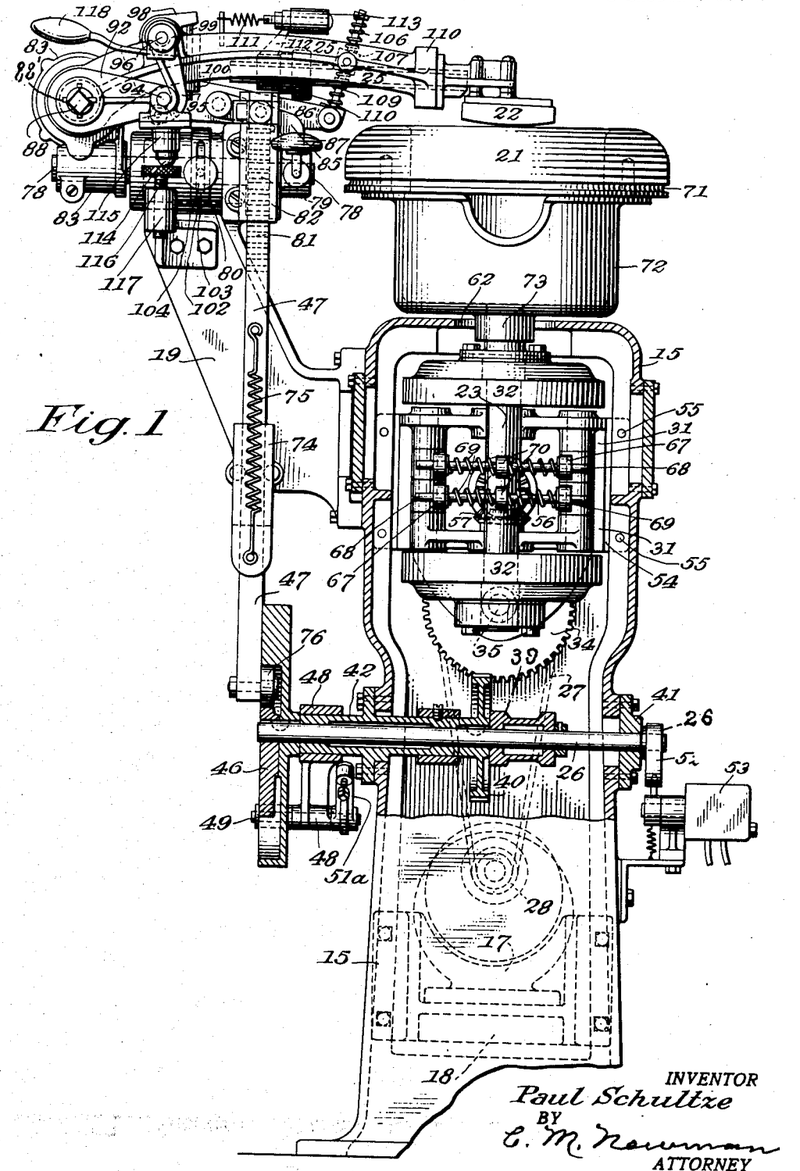
Fig. 1 shows a front sectional elevation of my improved brim flanging machine, the iron of which is in position for the beginning of a flanging operation.
Figure 2:
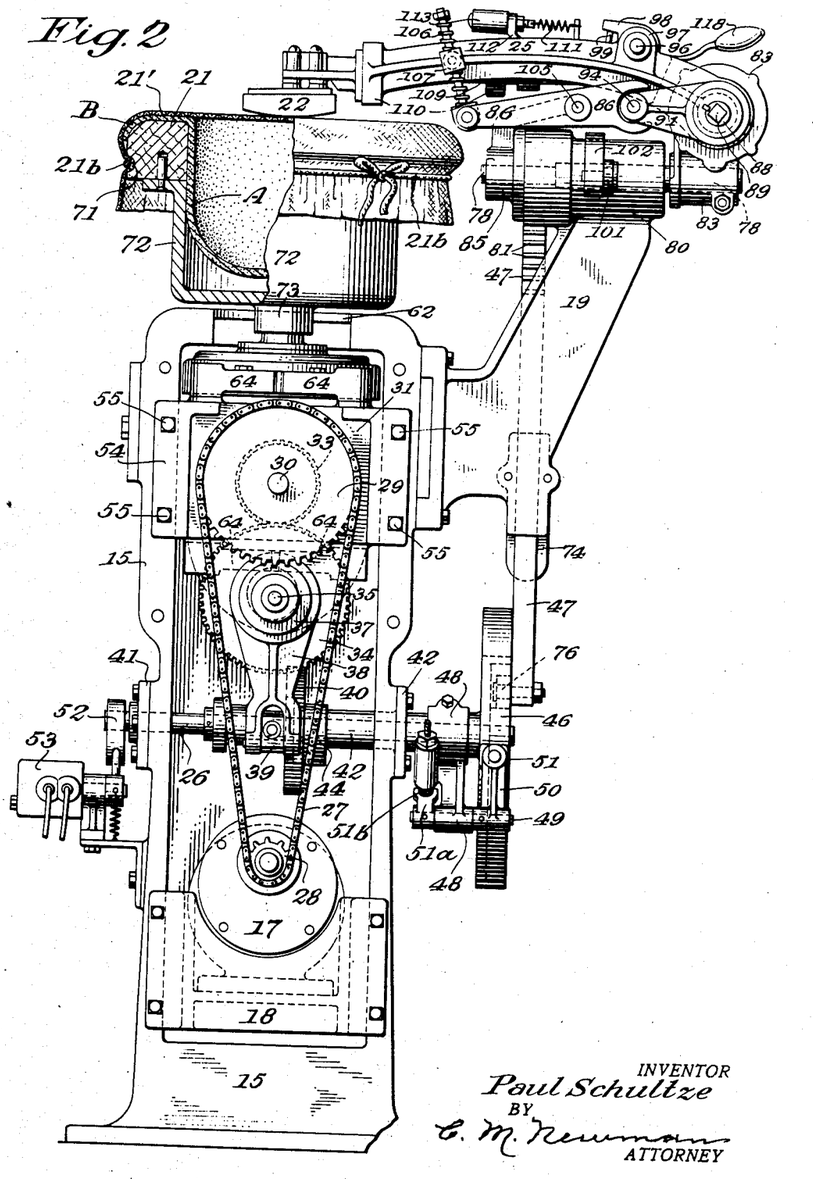
Fig. 2 is a rear elevation of the machine as shown in Fig. 1 but with its side closure plate removed, better to illustrate the mechanism within.

Referring now to the drive from the motor to the lathe mechanism, see Figs. 2 and 11, and through a cross shaft 26 to the iron carrying mechanism it will be observed that a sprocket chain 27 connects the sprocket 28 on the motor shaft with a relatively larger sprocket 29 on a drive shaft 30 that is journaled in the lathe frame 31. This frame supports the oval cams 32 and the other mechanism within the pedestal comprising the oval lathe drive mechanism. This lathe unit as a whole is shown detached, in side elevation, vertical section and sectional plan views, in Figs. 10, 11 and 12, respectively, and will again be referred to. A gear 33 is mounted upon the shaft 30 and meshes with and drives a larger gear 34 positioned below it upon a stud shaft 35 that is mounted in a bearing 36 in the lower portion of the frame 31. The gear 33 is provided with an eccentric hub portion 37 upon which a depending arm 38 is journaled and adapted to be raised and lowered with the rotation of the gear 34 for the purpose of operating a ratchet arm 39 and a ratchet wheel 40 which together with a cam 46 is keyed to the cross shaft 26, see also Figs. 1, 2 and 14, journaled in bearings 41 and 42 secured to the pedestal 15. The arm 39 is freely mounted on the shaft 26 adjacent the ratchet wheel 40. The outer end of arm 39 is hingedly connected to the lower portion of the before mentioned depending arm 38 and also serves to carry a pawl 43, Figs. 11 and 14, for engagement with the teeth of the ratchet wheel 40 that is keyed to the said cross shaft 26 and which latter is thus adapted to be moved step by step by successive operations of the pawl 43, ratchet arm 39, depending arm 38 and the before mentioned eccentric 37. The cam 46 serves not only to move the ironing arm 25 to feed the iron over the hat brim, through the medium of a slidable rack 47, but part of its periphery also serves as friction surface to engage the brake shoe 51. The purpose of this friction is to steady the movement of the cam while the iron is operating on the brim and also to prevent the cam 46 from turning forward through the action of its overbalanced side at d, see Figs. 3, 15 and 16.

Figure 14:
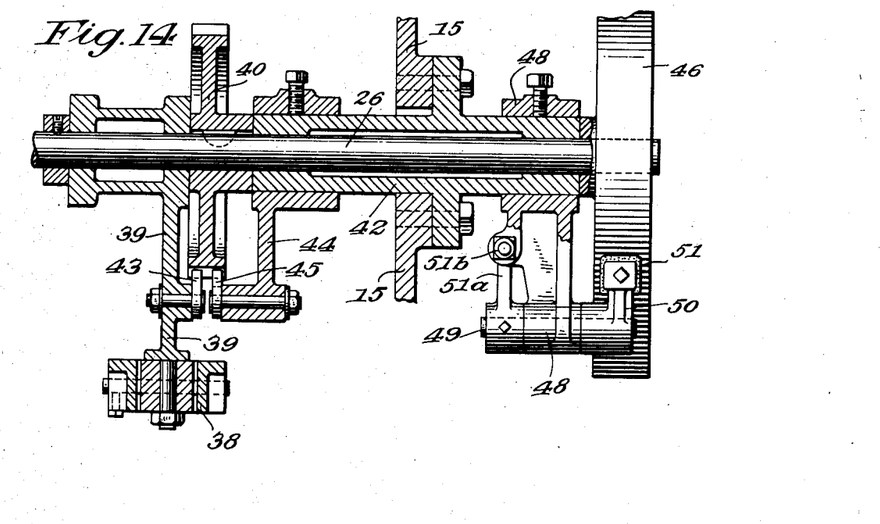
Fig. 14 shows a horizontal sectional view on an enlarged scale of the ratchet feed and brake mechanism carried on shaft 26, see Figs. 1, 2 and 11.

An arm 44 is secured to the inner end portion of the relatively long fixed tubular bearing 42 adjacent the ratchet wheel for the purpose of carrying a detent pawl 45, see Figs. 11 and 14 which serve to hold the ratchet wheel 40 against possible backward movement while being engaged and operated through the before mentioned eccentric mechanism.

Upon the outer end portion of this bearing sleeve 42 is secured an arm 48 that carries a short shaft 49 in its outer end portion and upon one end of which is mounted a brake lever 50 that carries the brake shoe 51. A relatively longer lever 51a is provided with adjustable spring tensioning means 51b, see Figs. 15 and 16 whereby frictional engagement of the shoe 51 with the periphery of the cam is insured. A cam 52 is secured to the opposite end of the shaft 26 and serves to operate a mercury switch 53 which controls the operation of the motor of the machine.

Figure 13:
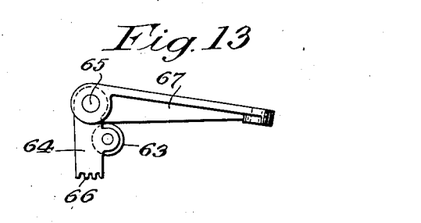
Fig. 13 shows a detached plan view of one of the roller bearing arms 67 for guiding the oval cam shown in Fig. 11.

Referring again to the oval lathe unit previously referred to, see Figs. 1, 2, 10, 11 and 12, it will be seen that the same is supported in the frame 31, a front side of which, see Fig. 2, is flanged at 54 and provided with screw holes for its attachment to the two edge portions of the pedestal 15 by screws 55, thus making the unit removably attached thus more convenient for assembling and repairs. The driven sprocket wheel 29 mounted on the short shaft 30 and carrying the gear 33 is, as before stated, journaled in the frame 31. Upon the inner end of this shaft 30, see Figs. 10, 11 and 12, is mounted a beveled pinion 56 that meshes with and drives a similar beveled pinion 57 mounted upon a vertical shaft 58 journaled in aligned bearings 59 of the web portions of the frame 31. A roller 60 is secured to two end portions of this shaft 58 and serves to frictionally engage the V groove in the inner peripheral surface 61 of the two oval cams 32 which are alike in construction and secured to a relatively larger vertical shaft, that extends through the upper cam, and an opening 62 in the top end of the pedestal, and as such comprises the before mentioned lathe spindle 23. This lathe spindle is driven from the shaft 58 through the frictional engagement of its two oval cams 32 which are guided in their rotary movements as between the friction drive wheels 60 and four idler rollers 63, two for each cam, that engage the outer periphery of the said cams and guide them in their rotary oval movement. These idler rollers are each mounted in a separate toggle arm 64, see also Figs. 12 and 13, on the ends of four vertical rocker shafts 65, which are journaled in webs of the frame. The inner ends of the upper and lower pair of toggle arms 64, are provided with teeth 66 which mesh with each other so that the movement of each pair will be in unison.

It will thus be seen that there are four toggle arms one secured to the outer end portion of each of the four rocker shafts 65. Two of the four rocker shafts 65 are mounted on one side of the drive shaft 30, one above the other, and two upon the other side. The two upper toggle arms being connected by the teeth 66, before mentioned, while the two lower toggle arms are mounted on the ends of the two lower shafts and similarly connected.

A spring tension means is provided for each pair of toggles and their idler guide rollers, and consists of four arms 67 two of which are secured to the lower ends of the upper pair of rocker shafts 65 and two on the upper end of the lower pair of shafts 65. These arms project forward, see Figs. 1 and 10 to 13 inclusive, and are provided with aligned holes in their outer ends in which a rod 68 is mounted to support springs 69 that tend to press the arms apart and the toggle arms 64 inward so that their idler rollers 63 will snugly ride upon the periphery of the cams, thus pressing the latter inwardly against the friction drive wheels 60.

From the foregoing it will be seen that the lathe is driven through the before mentioned sprocket chain and sprocket wheels, its shaft and friction drive wheels in a way to rotate the connected cams and their spindle at a uniform speed. In this connection it will be observed that the cams and the spindle float, so to speak, having no other bearings except that of their annular bearing surface with the friction drive wheels and the rollers so that the axis of the spindle will travel in an oval path agreeing with the oval of the hat block and the hat mounted thereon and whereby the iron carried by its supporting arm will ride smoothly upon a dampened flanging cloth 21' covering the hat, see Fig. 2.

The hat block 21 in practice is preferably made of wood and in different sizes to accommodate different size hats and hats of varying shapes and degree of curve of the brim. This block 21 is oval in shape and obviously supports the hat in an inverted position with its brim drawn down upon the annular oval surface of the block, see Fig. 2, where it is shown covered with a flanging cloth and tied with a string 21b, as customary, which encircles the cloth at the groove portion 71 of the block. The block is removably supported upon a metal holder 72 having a depending hub portion 73 that includes a socket to receive the shouldered upper end portion of the lathe spindle 23.

Referring now again and more specifically to the iron carrying arm 25 and its connections for operating the same as in the flanging of a hat brim, attention is called to the several general figures of the drawing. The before mentioned vertically slidable rack 47, which is operated by the cam 46 on the cross shaft 26, is guided in a housing 74, see Figs. 1 and 3, secured to the bracket 19 before mentioned. A spring 75 which has one end connected to the slide rack and the other end to the housing serves to partly counterbalance the weight of the arm 25 and its connected parts while swinging across and around the brim.

The iron carrying arm 25 is indirectly supported by the bracket 19 and is mounted to move both radially and circularly with respect to the surface of the hat brim upon which the iron 22 operates. This iron, in addition to its arm has limited swivel movements to permit it to automatically conform to the curved surface of the hat brim upon which it operates. In this respect it will be seen that bearings 77 are formed in the upper end portion of the bracket 19 for a rocker shaft 78 upon which a small pinion 79 is secured. This pinion is contained within a housing 80 of the bracket and is engaged and operated by teeth 81 in the upper end portion of the before mentioned slide rack 47, that is guided in a sleeved cap 82 secured to the bracket 19 and thereby serves to impart rocker movement to the shaft 78. A bearing 83 for the shaft 88 supporting the arm 25 is secured to one end of the shaft 78 and a closure bracket 84 is secured to the other end portion. This closure bracket includes an arm 85 which supports a lever 86 forming part of trigger mechanisms as will be again referred to. An operating handle 87 is secured to this closure bracket and serves as a means for manually turning the shaft 78 to raise the arm and position the iron on the hat brim as in the beginning of an operation, see Fig. 4.

Figure 8:
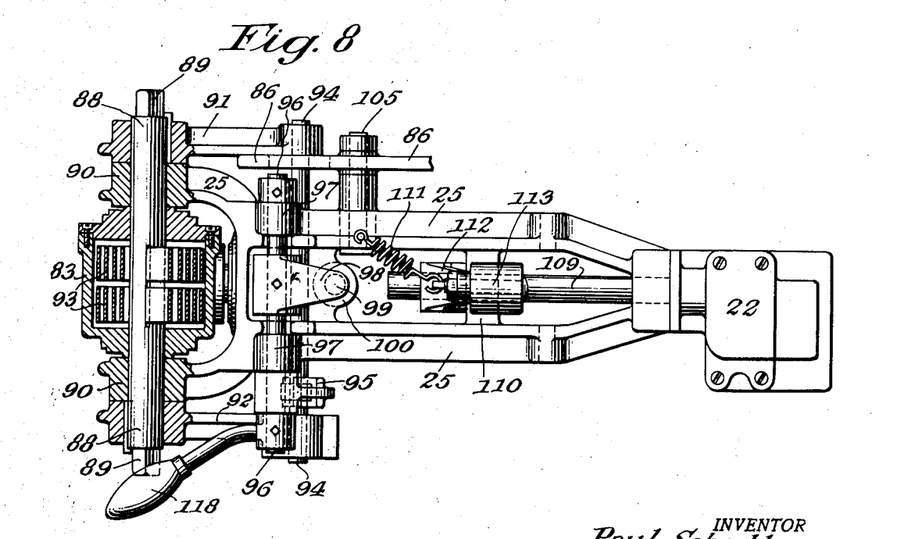
Fig. 8 shows a sectional plan view of the iron supporting arm with its associated mechanisms partially in section, better to illustrate the spring actuated hinge connection for the ironing arm.

The shaft 88 is journaled in the end portions of the bearings, see Figs. 8 and 9, and in bearings 90 of the forked end of the arm 25 and carries similar arms 91 and 92 keyed to its two end portions thus the shaft is free to rock within the bearing 83 by the action of the springs 93 one end of which is secured to the shaft 88 and the other fixedly attached to the shaft bearing 83 so that the tension of the springs is imparted to both the shaft and arm.

Figure 5:
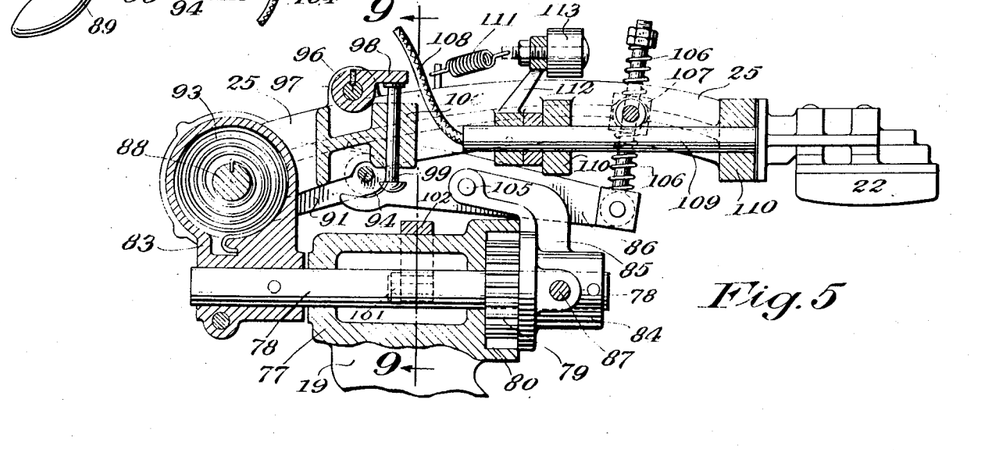
Fig. 5 shows a central vertical longitudinal section through the movable ironing arm for carrying the iron and its supporting mechanism taken on line 5—5 of Fig. 4.

The forked end of the iron supporting arm 25 is loosely mounted upon the shaft 88 though it is operatively connected with the shaft through the two arms 91 and 92. The forward ends of these arms are connected by a cross rod 94, see Figs. 4, 5, 7 and 8, which is adapted to be engaged by a depending latch 95 that is carried by a rocker shaft 96 mounted in bearings 97, see Figs. 1, 6, 8 and 9, of the iron supporting arm and is adapted to be swung forward and backward to engage and disengage said connecting rod 94. This latch and its rocker shaft are operated through a short arm 98 upon the shaft 96 that engages a push rod 99, see Figs. 1, 5, 6 and 7, slidably mounted in a bearing 100 of the iron supporting arm 25. The lower headed end of this push rod 99 engages the roller 101 carried upon an adjustable sector 102, see Figs. 5 and 9, when the arm 25 has swung partially around so that its iron is operating on the curled flange portion of the brim. This sector is adjustably mounted upon a cylindrical bearing portion of the bracket 19 and is provided with a slot 103 to receive a set screw 104 threaded to engage the bracket 19 to secure the sector in position, it being apparent that as the arm swings with its bearing 83 and rocker shaft 78 in the bearings of the bracket 19, the said push rod will strike the roller 101 in a way to force the rod upward and disengage the latch mechanism 95 from the rod thus to release the tension of the spring from the arm thereby causing the arms 91 and 92 and the connecting rod 94 to be thrown down, carrying with it the forked end of the lever 86 which is pivoted at 105 to the member 85 causing the forward end of lever 86 to move upward and through its spring 106 and connection 107 throw the arm 25 with its iron supporting arm outward, see Figs. 6 and 7. The adjustment provided for the sector 102 and its roller 101, see Figs. 1, 3, 6 and 9, is necessary in order to trip the mechanism and throw out the arm 25 and its iron, sooner or later, as may be required in the flanging of different styles of hat brims. From this it will be seen that the tension of the spiral spring 93 is utilized for two purposes, namely, to hold the iron against the hat brim during the flanging operation and to automatically throw it out at the completion of said operation.

The iron 22 is electrically heated through the medium of an inclosed resistance coil, not shown, fed by a wire 108 leading in through a hollow shaft 109 that is mounted for rocking motion in bearings 110 in the outer end of the arm. A spring 111 which has one end connected to the arm 25 and the other to a vertically disposed arm 112 secured to the said hollow rocker shaft 109. This arm 112 is further provided with a weight 113 which together with the spring serves to retain the iron in an approximate normal relation as it travels over and in respect to the surface of the brim in a way to insure uniform delicate operative engagement of the surface of the hat brim.

Figure 3:
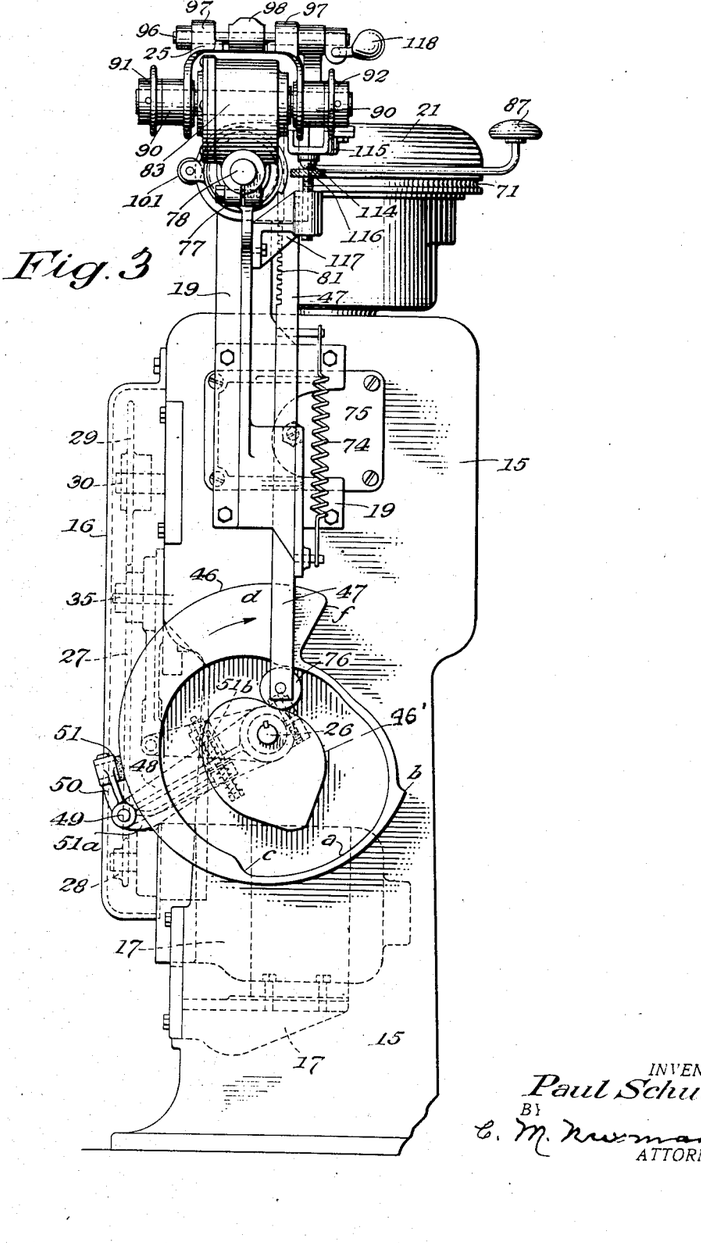
Fig. 3 shows a side elevation of the flanging machine illustrated in Figs. 1 and 2 but as seen from the right of Fig. 2.
Figures 15, 16:
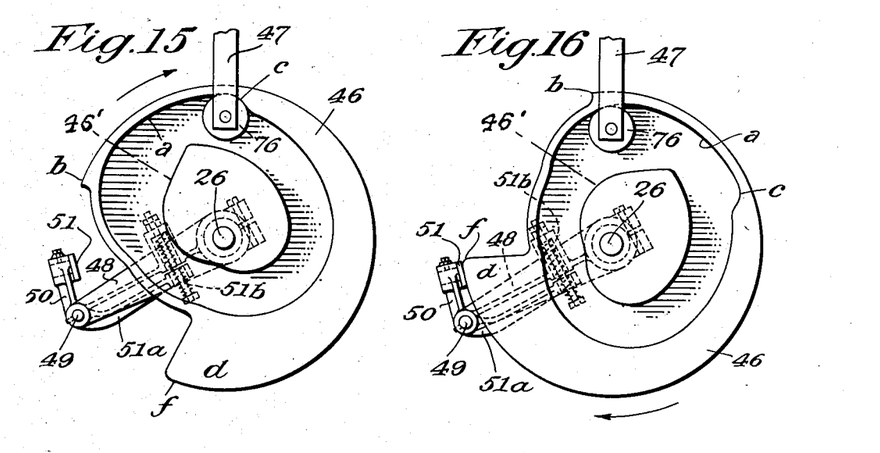
Figs. 15 and 16 show detached side views of the cam 46, in different positions, shown in Figs. 1, 2 and 3.

With the beginning of an operation the cam starts turning in the direction indicated by the arrow in Fig. 3 causing the roller 76 and slide rack 47 to gradually raise, the rotation of the cam being substantially uniform, with the brake shoe 51 riding upon the periphery of the cam serving to steady the movement of the same during its rotation. When the point b of the cam leaves the brake shoe 51, the roller 76 on the rack will have raised to the point indicated by c which clears it from the inner edge of the cam groove and allows it to roll against the outer surface a of the groove as indicated in Figs. 15 and 16, whereupon the greater weight of the cam as shown at d will cause the cam to drop around until the point f again engages the shoe. In this connection it is to be borne in mind that the ratchet wheel 40, see Fig. 11, herein before referred to is provided with teeth only upon approximately ¾ of its circumference so that when the cam 46 has made substantially a half rotation the arm 25 will have moved from the top position, see Figs. 3 and 4, to the side position, see Figs. 6 and 7, so that the weight of the arm will draw the slide rack and its roller upward shifting the engagement of the roller from the inner edge of the cam to the outer edge as shown at c at which point the outer surface of the cam groove is truly circular with the axis of the cam permitting the latter to fall around by gravity of its overbalanced side d until the point f engages the brake shoe. At this moment the blank space in the ratchet wheel, before mentioned, will have reached the point where the pawls are located thus preventing any further rotary feeding movement of the cam.

Figure 6:
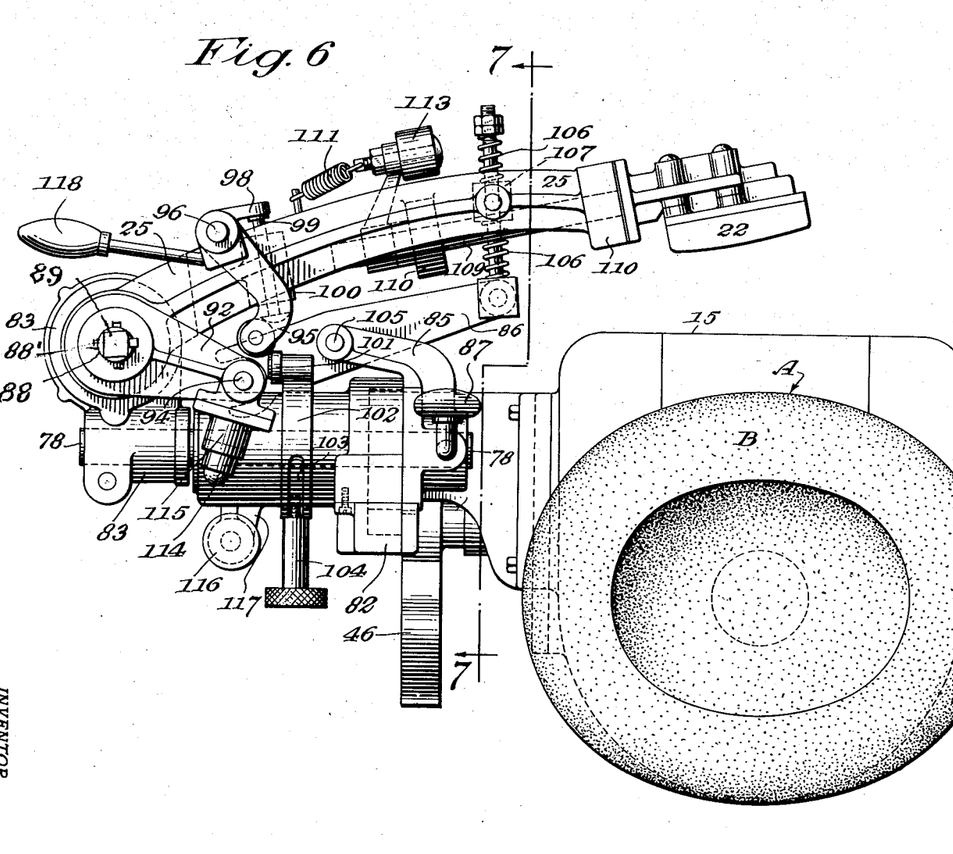
Fig. 6 shows a further top plan view of the machine on an enlarged scale, the ironing arm being released and its iron in a disengaged position, as at the completion or a brim flanging operation.
Figure 7:
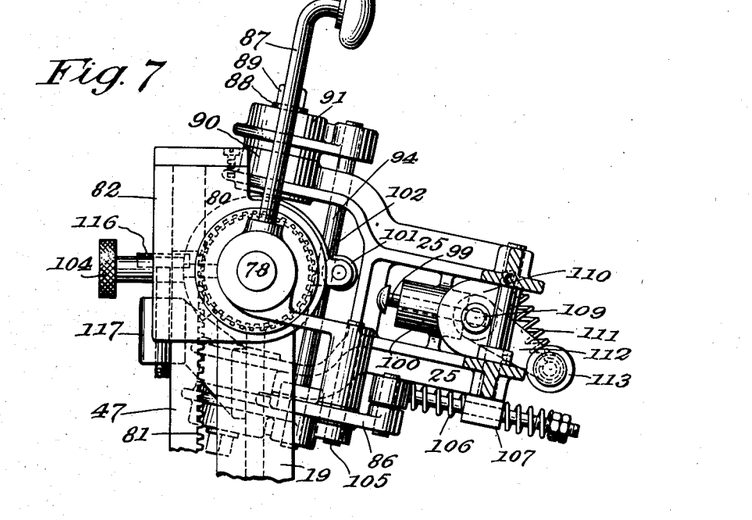
Fig. 7 shows a cross sectional elevation, taken on line 7—7 of Fig. 6 where the ironing arm has been shown tripped off out of operative engagement with the hat body.

In order to start the machine the operator would first press downward upon the handle 87 thus pulling the arm assembly on shaft 78 upward from the position shown in Figs. 6 and 7 to that shown in Figs. 1, 2, 3, 4 and 9 substantially ¼ of a turn, bringing the ball roller 114, in the bracket 115 attached to the rod 94 on the near side of the machine, into engagement with the adjustable stop 116, see Figs. 1 and 3, mounted in a bracket 117 secured to the main bracket 19, which engagement and further downward movement of the arm 25 will cause it to swing with its shaft 88 in a manner to tighten the spring within the bearing 83 sufficiently to permit the latch 95 to engage the rod 94 and retain the tension of the spring upon the iron arm 25. It is obvious that in pressing the starting handle 87 downward, the sliding rack 47 with its roller 76 is also pushed downward from the position shown in Fig. 16. The roller 76 will thus bear against the inclined face of the inner cam portion 46′ and thus cause the cam to rotate to the starting position as shown in Fig. 3.

Fig. 3 shows the feeding cam 46 in a starting position while Fig. 15 shows the cam in position advanced to a point where the latch 95 becomes released and the arm 25 drops away from the hat and at which moment the roller 76 shifts from the inner face of the cam to the outer face a of the cam. At this moment the small cam 52 on the opposite end of the cross shaft 41 has engaged the lever which operates the mercury switch thus cutting off the current to the motor and automatically stopping the machine, with this cam in the position shown in Fig. 15 and with the connected rack and roller in a starting position, the shoe 51 becomes engaged and the blank point in the ratchet wheel reached.

One end of the shaft 88 is provided with a squared extension 89 for the attachment of a wrench, not shown, and additional keyways 88′ provided in the arms 92 so that the shaft can be adjusted with respect to the different keyways in the arms and secured by the repositioning of the keys, thus adjusting the tension of the spring 93 within the shaft bearing, thereby increasing or decreasing the pressure of the iron upon the hat brim.

As the machine stands idle the cam and its connections remain in this position until the iron supporting arm is again positioned upon the hat body which latter movement causes the roller 76 to move down the inclined inner surface of the cam. In this respect it will be understood that immediately following the positioning of the iron upon the underside of the brim of the hat body, as shown in Fig. 4, the hat is rotated beneath the iron which is gradually guided upward of and down around the annular periphery of the brim portion through the action of the slide rack 47 which serves to turn the shaft 78 that carries the ironing arm. This movement obviously continues from the position shown in Fig. 4 until the arm has worked over and down the curled edge portion of the brim and to a point where the head of the push rod becomes engaged with the roller 101 on the adjustable sector 102. This engagement serves to shove the rod 99 upward, see Figs. 7 and 9, in a way to bring the arm 98 and its shaft 96 together with the latch 95 causing the latter to become disengaged from the rod 94 in a way to release the latter and the ironing arm to which it is swivelly connected and thereby leaving the arm free to be thrown outward by the action of its spring 93 from an operating position against the side of the hat to a disengaged and resting position as shown in Fig. 6.

In this connection it will also be observed that I have provided manual means for quickly throwing off the arm from the hat brim should it be necessary for any reason, during the flanging operation, that is during the travel of the iron across the undersurface of the rotating brim, which means consists of an operating handle 118, see Figs. 4 and 6, that is connected to the rocker shaft 96 upon which the latch 95 is mounted, it being understood that a downward pressure of this handle will rock the shaft 96 and release the latch 95 leaving the spring 93 free to throw the arm and its iron out free of the hat.

Having thus described my invention, what I claim and desire to secure by Letters Patent is:

1. A hat flanging machine of the class described comprising a lathe spindle, spaced apart flanged oval shaped cams mounted thereon, rollers positioned on opposite sides of the flange of each of said cams one of said rollers being a driven roller and the other an idler roller, spring means for holding the idler roller against the cam in a way to support the latter.

2. A hat flanging machine of the class described comprising a lathe spindle, spaced apart flanged oval shaped cams mounted thereon, a friction driving roller for each of said cams, a pair of idler rollers in engagement with the outer flange portion of each of said cams and means for holding said idler rollers in engagement with the outer flange portion of the said cams.

3. A hat flanging machine of the class described comprising a lathe spindle, spaced apart flanged oval shaped cams mounted thereon, having a groove in the annular face of the two said cams, a friction driving roller in engagement with each of the said grooves for rotating said cams and their spindle, a pair of yieldably mounted rollers in engagement with the opposite face of the flanged portion of each of said cams and spring means for each pair of said yieldably mounted rollers to insure their close engagement of the said cams.

4. In an oval lathe of the class described the combination of a supporting frame, a drive shaft journaled therein, a driven shaft geared to the driving shaft, a friction drive roller mounted upon the driven shaft, a lathe spindle in parallel alignment with the driven shaft, a cam mounted upon the lathe spindle having an annular flanged portion that is engaged upon one side by the frictional drive roller upon the driven shaft, a pair of yieldably mounted rollers in engagement with the outer face of the flanged portion of the cam each in spaced relation to the before mentioned drive roller, and means for holding said idler rollers in engagement with the flange of said cam to support the cam and its shaft and insure an oval movement of the lathe spindle with each rotation thereof.

5. A hat flanging machine of the class described including a lathe spindle, spaced apart flanged oval shaped cams mounted thereon, a driving shaft mounted in the frame parallel to the spindle, friction drive rollers upon the shaft in engagement with one side of the flange of each of said cams, rocker shafts journaled in the frame, an arm upon each shaft bearing a roller to engage the flange of the cam in opposite relation to the friction drive rollers, an additional arm secured to each of the said rocker shafts, and spring means connected with said last mentioned arm to insure engagement of the rollers with the periphery of the cam and thus support the cams and their spindle in its floating oval travel.

6. In a hat flanging machine, the combination with a pedestal, of an oval lathe unit including a frame that is detachably mounted therein, a motor, driving connections for operating the lathe, a hat block mounted on the lathe, an iron mounted to operate upon the brim of a hat when positioned on said hat block, a pair of oval cams mounted on the lathe spindle in spaced relation, a drive shaft journaled in the frame, a drive roller supported on said shaft in frictional engagement with the annular peripheral portion of each cam, mounted upon the drive shaft, a pair of supporting rollers for each cam and in bearing relation opposite to that of the frictional driving roller in a way to support the cams and rotate the same to move the axis of their spindle in an oval path.

7. In a hat flanging machine of the class described, a pedestal, a lathe, a hat block mounted thereon, means for operating the lathe, a bracket secured to the pedestal, a rocker shaft mounted in the bracket, means for rocking the shaft, a shaft support secured to the rocker shaft, an adjustable shaft within the support, an ironing arm mounted on the adjustable shaft, a spring having one end connected to the shaft support and the other to the adjustable shaft, latch mechanism connecting the adjustable shaft with the arm for exerting pressure of the iron upon the hat during the travel of the iron over the hat, and trip mechanism to automatically release said latch when the iron has traversed the width of the brim of the hat and permit the spring to throw the arm and iron away from the hat.

8. In a hat flanging machine of the class described, the combination with a rotatable hat body, of a supporting member and an arm carrying an iron for operating upon the hat body, a shaft support mounted for swinging movement, an adjustable shaft within the support, a spring having one end connected to the support and the other to the shaft adapted to hold the iron against the hat body during the ironing operation, the said iron and arm being loosely mounted upon the adjustable shaft and fixedly connected thereto through a latch, means to insure pressure of the spring upon the hat body, automatic means for disconnecting said latch in a way to shift the action of the spring to throw the arm out from the hat.

9. In a hat flanging machine of the class described, the combination of a shaft support, a shaft journaled therein, an ironing arm hingedly connected to the said shaft, a spring connecting the support and shaft, additional arms secured to the said shaft extended forward in spaced relation to the ironing arm, a tie-rod connecting the forward ends of the said additional arms, a rocker shaft journaled in the arm, a latch carried on the rocker shaft to engage the said tie-rod to hold the pressure of the spring upon the arm and hat, a short arm mounted upon the last mentioned rocker shaft, a slide rod for engagement by the short arm, automatic means adapted to engage the slide rod and operate the rocker shaft and latch at the completion of an ironing operation in a manner to shift the action of the spring to throw the arm away from the hat body.

10. In a machine of the character described, in combination, a pedestal, a rotatable hat support, means for rotating said support, a rocker shaft, a spring housing bracket carried by said shaft, an arm carried by the shaft, a flanging tool flexibly carried by the arm, means for positioning the flanging tool on the hat, means for moving said tool over the surface of a rotating hat mounted on said support, a spring intermediate the housing and shaft for urging said tool toward said support, means for automatically reversing the action of the spring at the completion of the flanging operation, to throw the arm and its flanging tool way from said hat, and cushioning means associated with the arm to overcome the shock of the same when thrown from the hat.

11. In a machine of the character described, a pedestal, a rotatable hat support, a rockable shaft support, means for rotating said hat support, an arm and ironing tool carried by the rockable support, a spring for holding the tool for positioning the ironing tool on the hat, means for moving said tool over the surface of the rotating hat brim, a rocker shaft carried in the rockable support, arms secured to said rocker shaft, a rod carried by said arms, a latch carried by the ironing arm to engage said rod to tie in the action of the spring to the ironing arm and urge it toward the hat, an adjustable contacting means, means carried by the ironing arm for engagement with the said contacting means to release the latch and to apply the action of the spring to move the iron away from the hat, and cushioning means to come between the lever and ironing arm.

12. In a hat flanging machine of the class described, the combination of a pedestal, an arm carried thereby, a rotatable hat support, a rockable shaft carried by the arm, a bracket on the rocker shaft, means for rocking the shaft, a shaft support carried by the rocker shaft, a shaft journaled in the shaft support, a flanging arm hingedly connected to the support shaft, arms secured to said journaled shaft, a rod carried by the arms, means carried by the rod to tie in the action of the spring with the flanging arm and to urge it toward the hat, a lever hingedly supported on the bracket and in engagement with the rod, cushioning means between the lever and ironing arm, an adjustable contacting means carried by the first mentioned arm, means carried by the flanging arm for engagement with the contacting means to release the holding means and flanging arm and to apply the action of the spring to move the iron away from the hat.

13. In a hat flanging machine of the class described, the combination with a rotatable hat body, of a support, a rockable shaft mounted therein, means for rocking the shaft, a shaft support carried by the rocker shaft, a shaft journaled in the shaft support, an ironing arm hingedly connected to the last mentioned shaft, a spring connecting the shaft support and its shaft, an arm secured to said shaft, means carried by the ironing arm for engagement with said last mentioned arm to tie in the action of the spring to the ironing arm to urge it toward the hat body, means carried by the ironing arm for engagement with the first mentioned support to release the holding means of the iron against the hat and to reverse the action of the spring to move the iron away from the hat.

14. In a hat flanging machine of the class described, the combination of a lathe, a rotatable hat body carried by the lathe, a support, a rockable shaft mounted in the support, means for rocking the shaft, a shaft bearing carried by the rocker shaft, a shaft journaled in the bearing, an ironing arm hingedly connected to the bearing shaft, a spring connecting the bearing and its shaft, engaging means carried by the ironing arm for connection with said last mentioned shaft to tie in the action of the spring to the ironing arm and to urge it toward the hat body, means carried by the ironing arm for engagement with the support to release the engaging means and to reverse the action of the spring to move the iron away from the hat.

15. In a hat flanging machine of the class described, the combination with a rotatable hat, a support, a rockable shaft mounted therein, a bracket on the rocker shaft, means for rocking the rocker shaft, a shaft bearing carried by the rocker shaft, a shaft journaled in the bearing, an ironing arm hingedly connected to the bearing shaft, a spring intermediate the bearing and shaft journaled therein, arms secured to said bearing shaft, a rod carried by the arms, means carried by the ironing arm to engage said rod to tie in the action of the spring to the ironing arm to urge it toward the hat, a contacting means carried by the support, means carried by the ironing arm for engagement with the contacting means to release the spring holding the iron against the hat and to permit the spring to move the iron away from the hat.

16. A flanging machine of the class described, comprising a frame, a floating lathe spindle journaled therein and adapted to support a hat block and hat, an oval cam mounted on the spindle and having an annular flange with a V groove formed therein, driving means mounted in the frame including a friction roller to engage the groove of the flange of the cam, idler rollers positioned against the face of the cam opposite to that of the driving roller, means for yieldably holding the idler rollers in spaced apart engagement with the flange of the cam.

17. A flanging machine of the class described, comprising a floating lathe spindle adapted to support a hat block and hat, spaced apart oval cams mounted on the spindle having annular grooved flanges disposed toward each other, a frame, drive means mounted in the frame including friction rollers to engage the flanges of the cams, idler rollers positioned against a face of the cam opposite to that of the driving rollers, means for yieldably holding the idler rollers in engagement with the cam.

18. A flanging machine of the class described, comprising a floating lathe spindle adapted to support a hat block and hat, spaced apart oval cams mounted on the spindle having annular grooved flanges disposed toward each other, a frame, drive means mounted in the frame including friction rollers one to engage the flange of each cam, idler rollers positioned against a face of each cam opposite to that of the driving roller, separate means for yieldably holding the idler rollers in spaced apart engagement with the cam.

19. The combination of a hat brim ironing machine of the character described, a pedestal, a lathe adapted to support and rotate a hat in an inverted position, an arm carried by the pedestal, a shaft mounted in said arm, a shaft support rockably mounted with respect to the supporting arm, a cross shaft mounted in said rockable support, an iron carrying arm hingedly supported by said cross shaft, there being a forked connection between the said rockable support and said iron carrying arm with respect to the cross shaft, spring means intermediate the iron carrying arm and the rockable support to urge the arm and iron toward the hat, means for rockably moving the support to feed the iron across the hat brim.

20. A hat flanging machine including a pedestal, a cam shaft journaled therein, means for operating the shaft, a cam mounted on the shaft, a bracket secured to the pedestal, a rack slidably mounted on the bracket and operatively engaging the cam for longitudinal movement, an iron supporting arm mounted upon the bracket adapted for radial swinging movement connected with said slide rack, spring means adapted to urge the arm toward and iron against the hat, and reversing means intermediate the spring and arm to reverse the action of the spring at a predetermined point to cause it to move the arm and iron away from the hat.

21. A machine of the character described in combination, a pedestal, a hat support, means for rotating said support, an arm and flanging tool hingedly supported, a spring connected with the arm, means for tensioning the spring while positioning the flanging tool on the hat, a latch for maintaining the tension of said spring, means for moving said tool over the surface of a rotating hat mounted on said support, trip means for automatically releasing the engagement of said latch and a reversing lever intermediate the spring and arm to direct the action of said spring to move the arm and its ironing tool away from the hat.

22. In a hat flanging machine, means for rotatably supporting a hat, a shaft journaled in the support, an arm bearing a flanging tool hingedly connected to the shaft, a spring intermediate the support and arm, spring actuated arms mounted on the shaft, a latch and associated means to connect the spring actuated arm and the iron carrying arm to urge the arm and tool toward the hat during the flanging operation and means to automatically release said latch to permit the spring to throw the arm and iron away from the hat at the completion of the flanging operation.

PAUL SCHULTZE.